June 1, 1943.　　　　I. N. HERMAN　　　　2,320,778
TIRE VULCANIZING APPARATUS
Filed April 13, 1942　　　3 Sheets-Sheet 2
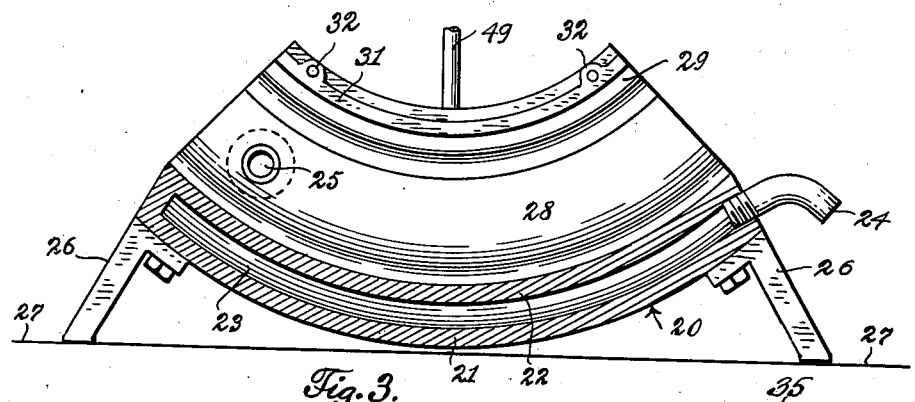
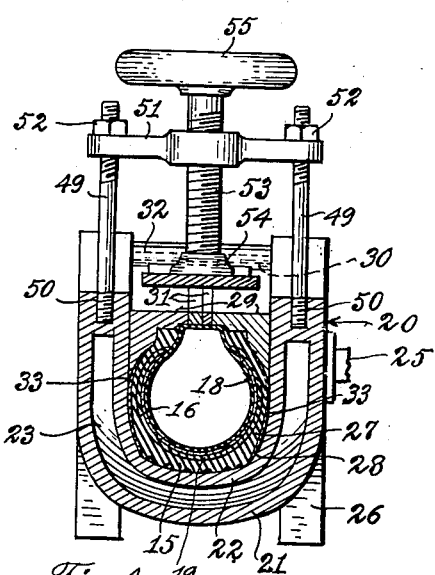
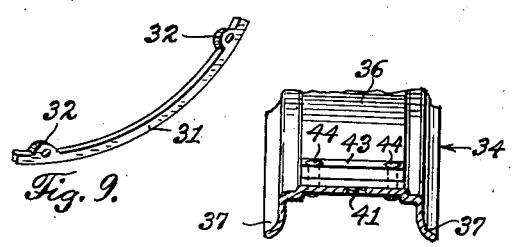
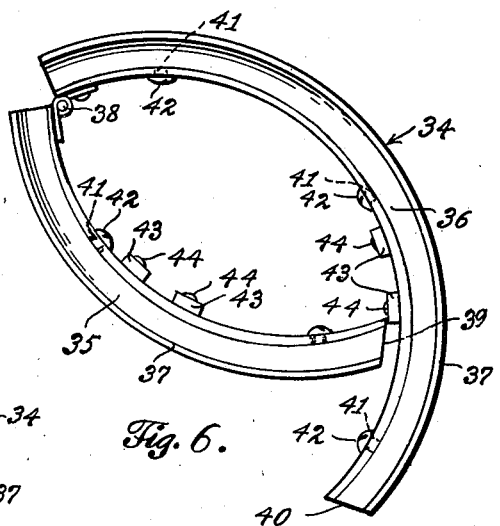
WITNESSES
Nils E. Goodrich
Clementine deBenedette
INVENTOR.
Irving N. Herman
BY
Joshua R. H. Potts
HIS ATTORNEY June 1, 1943.  I. N. HERMAN  2,320,778
TIRE VULCANIZING APPARATUS
Filed April 13, 1942  3 Sheets-Sheet 3

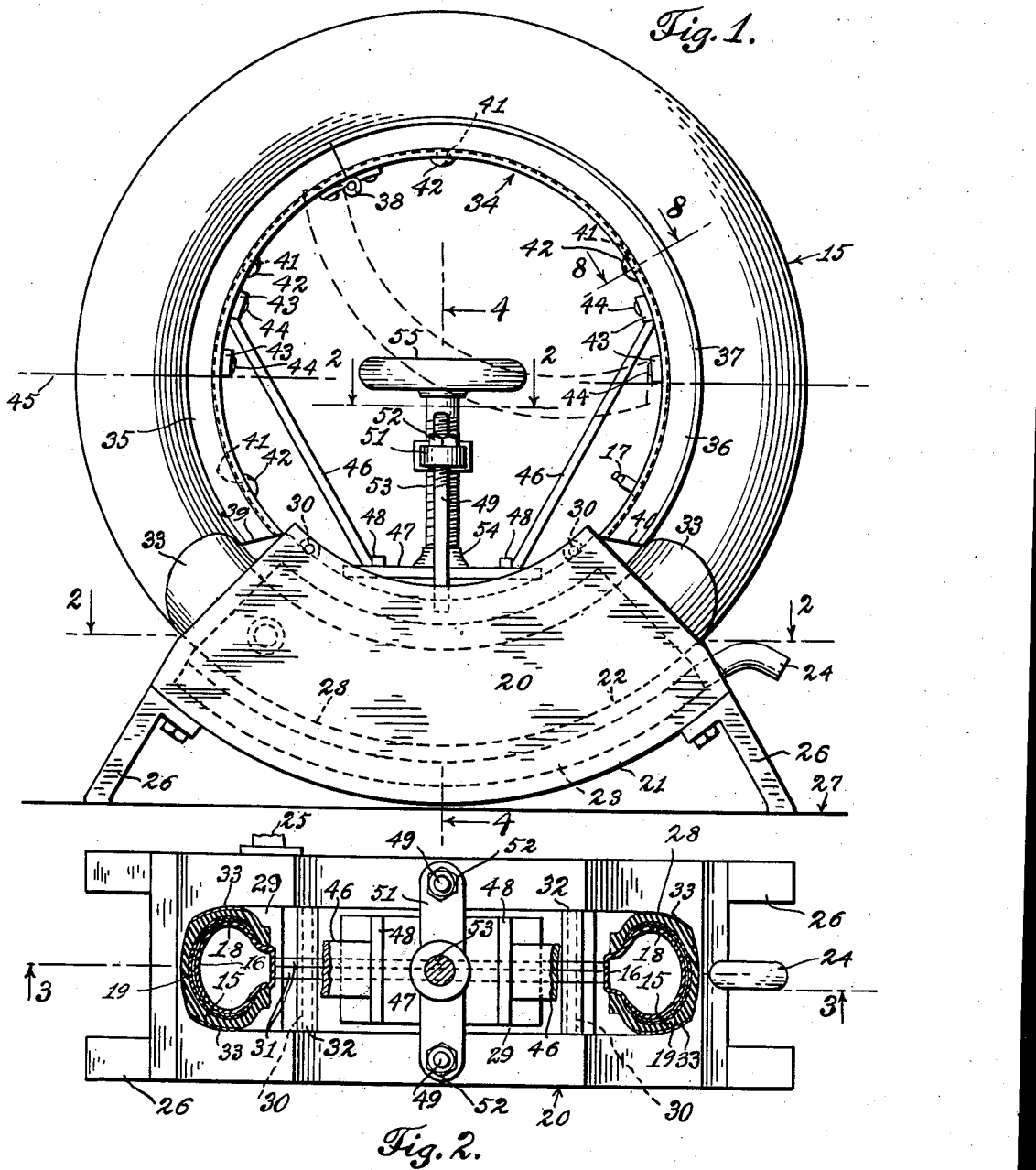

WITNESSES
Nils E. Goodrich
Clementine deBenedetti

INVENTOR.
Irving N. Herman
BY Joshua R. H. Potts
HIS ATTORNEY

Patented June 1, 1943

2,320,778

UNITED STATES PATENT OFFICE 2,320,778

TIRE VULCANIZING APPARATUS

Irving N. Herman, Chicago, Ill.

Application April 13, 1942, Serial No. 438,769

10 Claims. (Cl. 18—18)

This invention relates to an apparatus or outfit to facilitate the vulcanization of tire repairs and primarily where there is a rupture, cut or blow-out in the side wall or web of a pneumatic tire, shoe or casing, though it may be used in repairing similar defects in the tread, which do not require retreading of the entire circumference of the tire.

An important object of the invention is to provide an apparatus or device of the class described, which will permit the use of an ordinary inner-tube which is comparatively inexpensive and which may even be patched providing the patches are vulcanized and not cold patched, in lieu of the ordinary kidney or D-shaped air bag or sack which are quite expensive and relatively unobtainable at the present time, but still make it possible to properly and efficiently repair a damaged tire casing with efficiency, economy and dispatch.

Another object of the invention is to provide an apparatus or device which will facilitate the vulcanization of tire repairs, but accommodate tire casings of several sizes within a certain diameter or radius range and still permit the same to be carried out efficiently and inexpensively as well as permit one or more damaged portions of the casing to be simultaneously repaired or vulcanized, particularly where the breaks are not too far distantly spaced apart.

Another object of the invention is to provide an apparatus of the class described which will permit the use of an ordinary clincher rim modified in accordance with the invention to hold the tire in position and against movement in the mold and against the matrix thereof as well as accommodate several sizes of tires with the same tube, but which will accommodate tubes of correspondingly different sizes and insure proper and uniform pressure between the mold and the tire casing during the vulcanizing of the damaged portions of the latter, whereby shifting will be prevented during the vulcanizing operation when the inner tube is inflated to the requisite pressure and the repair of the casing subjected to the necessary heat for vulcanizing the same, thereby avoiding the possibility of defective repairs.

Another object of the invention is to provide a pressure ring which is collapsible and corresponds in cross section to a rim, and is so constructed that it may be readily inserted or removed and in which the apparatus includes in conjunction therewith, novel and simple means for holding the rim in position against the mold and at the same time against the inner tube and casing of the tire so as to insure uniform pressure at the point of vulcanization and permit the same to withstand the necessary pressure of 60 pounds per square inch or more during the vulcanizing operation, and which when the inner tube is inflated to the desired pressure will cause the split retaining ring to automatically engage the mold and adjust itself to hold the parts in assembled relation by means of a separable clamping means whereby relative movement between the tire and the mold is absolutely prevented, while at the same time hold the tire in proper position to insure a perfect repair and vulcanization even though the tires may slightly vary in size within a certain range.

Another object of the invention is to provide a means insertable between the tire casing and the inner tube to protect the rubber of the latter against excessive aging or deterioration from exposure to heat and pressure, particularly where the same is excessive, during the vulcanizing of repairs whereby the inner tube may be used comparatively indefinitely and also to prevent the formation of beads or shoulders at the ends of the mold by reason of the inner tube and casing pushing out at such points under high pressure such as generally used in vulcanizing.

Still another object of the invention is to provide a sectional split rim having a cut-out to accommodate a mold, and means for receiving the valve stem of an inner tube in several positions as well as eliminating holes through which the tube might be forced in addition to preventing pinching and puncture of the tube at various points and permitting various areas of the tube to be exposed to the direct action of the heat of vulcanization, thereby greatly extending the life of the tube, instead of requiring only one segment which is repeatedly subjected to the action of vulcanizing heat.

Another object of the invention is to provide a simple and novel separable clamping means for holding the tire to the mold, but which will obviate the necessity for accurate construction and machining of the parts, while at the same time accommodating several sizes of tire casings without detracting from the efficiency, strength and durability.

Further objects and advantages will appear and be brought out more fully in the following specification, reference being had to the accompanying drawings, in which:

Fig. 1 is a side elevation of a tire vulcanizing apparatus constructed in accordance with the invention and applied to a tire mounted in position for vulcanization of a repair.

Fig. 2 is a horizontal sectional view taken on the line 2—2 of the Fig. 1.

Fig. 3 is a vertical sectional view taken on the line 3—3 of Fig. 2.

Fig. 4 is a vertical cross section taken on the line 4—4 of Fig. 1.

Fig. 5 is a perspective view of a pressure and holding plate forming part of the device.

Fig. 6 is a detailed side elevation of a collapsible pressure and holding rim forming part of the device.

Fig. 7 is a fragmentary inside elevation of the sectional rim showing the hinged connection between the sections of the rim.

Fig. 8 is a fragmentary sectional elevation of a portion of one of the rim sections.

Fig. 9 is a detailed perspective view of a metallic insert used to vary the width of the bead plate or removable bead irons to accommodate or fit tires of different sizes.

Figure 10:
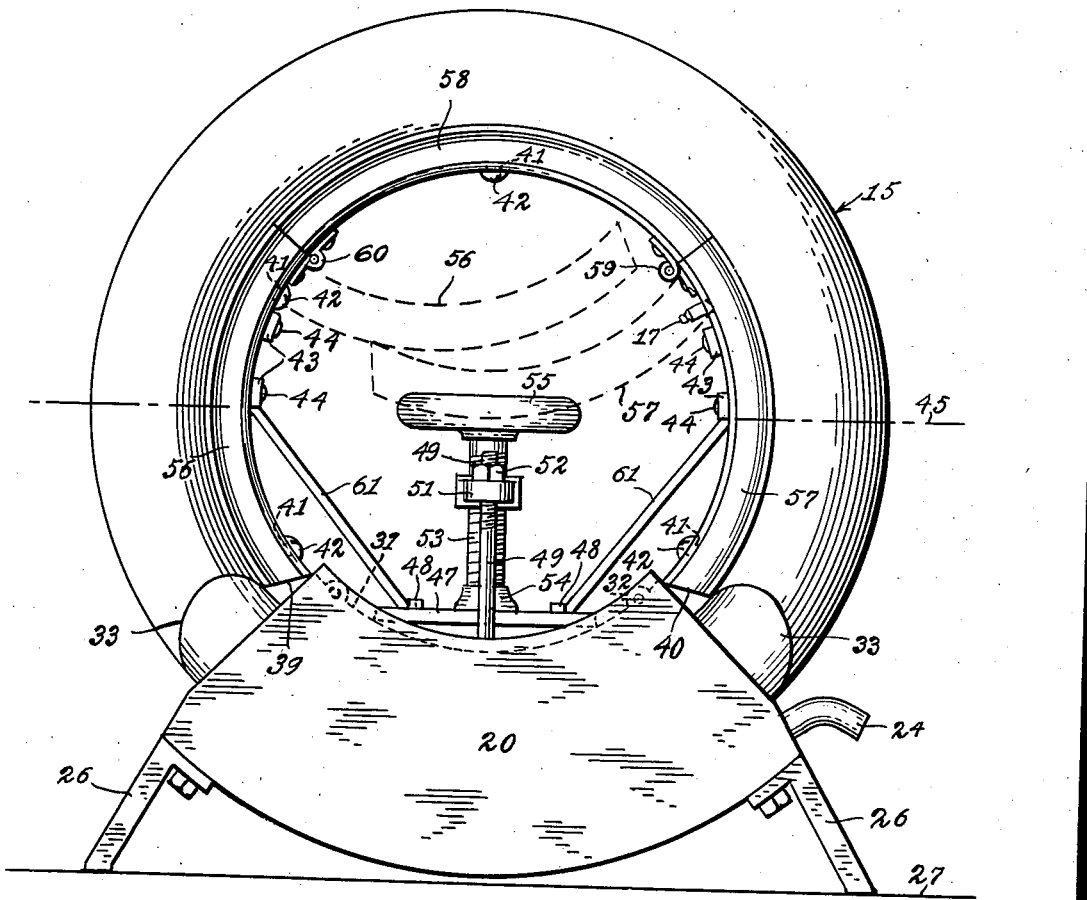
Fig. 10 is a side elevation similar to Fig. 1, but showing a modified form of sectional rim.

Referring to the drawings in detail and more particularly Figs. 1 to 9 inclusive, 15 designates an ordinary automobile or pneumatic tire casing or shoe which may be damaged, usually split, cut or torn by a blowout in one or both of its side walls or webs at one or more points and if at a plurality of points closely adjacent, they may be repaired at the same time or as one repair. In the vulcanized repair of a damaged tire the wall is usually hollowed out externally around the damaged part or area and is prepared by removing the defective area around the puncture, split, cut or blowout by cutting, scraping or otherwise. The hollowed out portion or recess at this area of the wall of the tire casing or shoe is then reenforced in the usual or preferred way with fabric, threads or cords joined with uncured rubber to be vulcanized and placed in a plurality of intersecting directions such as 3 or 4 so as to be vulcanized or joined to the wall of the tire casing under the proper pressure of from 60 to 150 pounds per square inch or more and the necessary heat from the mold, so that the threads are joined by the vulcanization to the wall of the tire when subjected to the proper temperature and curing in order to repair and reenforce the tire at such point or points. An inner tube 16 in partially deflated condition is inserted in the tire casing and will work efficiently with tires of several sizes within a certain range so that 6 or 7 sizes covering about 95% of those normally in use could be treated with the same apparatus. This tube has the usual inflating valve or stem 17, and if a patched inner tube is used, the patches must be vulcanized patches. Previous to the insertion of the inner tube within the casing a flexible asbestos or other heat insulating sheet 18 is inserted in the casing over the damaged area, or this may be slipped in between the casing and the tube after the latter is inserted in the casing. A reliner or lining 19 may also be inserted in an old casing at the inner portion over the inner tube and inner surface of the tire, and while this is not absolutely necessary or essential it will tend to prevent blowouts or puncturing of the inner tube due to the protection afforded thereby.

With the tire thus assembled, it is placed or inserted in the mold 20 usually of arcuate or segmental-shape having arc-shaped outer and inner walls 21 and 22, preferably convex at the bottom and provided with a steam cavity 23 therebetween having an inlet 24 and an outlet 25. This mold 20 may be supported upon a suitable frame or uprights 26 or the casting of the mold may be extended in somewhat trapezoidal-shape to form a base for steady support upon a suitable horizontal surface or floor represented at 27. The top of the mold has a concaved inner chamber 28 which accommodates the tire such as represented at 15 and supports the same in an upright position. A pair of removable bead irons 29 usually connected by dowel pins 30 are inserted between the inner walls 22 at the chamber 28 to fit over the beads of the tire casing and part way down the walls of the same. These bead irons form a plate which may be varied in width by means of a plurality of metallic inserts 31 usually of bronze or white metal and varying in thickness so that the width of the plate may be varied for slightly different sized tires. The irons and inserts are provided with ribs 32 across the concave side adjacent each end and bored through transversely to receive the dowel pins 30 so that they may be held in assembled relation. In addition to the fire resistant or heat insulating sheet 18, such as asbestos and the reliner or lining 19, flexible tin or other sheet metal plates 33 of oval-shape may be inserted between the tire and the mold at the chamber 28 and between the tire casing and the bead plates on opposite sides of the mold at each end, so as to project therethrough or partially thereinto and partially beyond the ends of the mold and over the adjacent areas of the casing to prevent the rubber of the latter being pushed out abruptly at the ends of the mold when subjected to high pressure and heat of vulcanization which tends to melt or soften the rubber and thus avoid leaving ridges or shoulders on the external surface of the casing after the damaged section has been vulcanized.

With the tire held in the mold in position to be vulcanized in the manner described, I provide simple, novel and efficient means for holding the bead irons or plate in position in the mold against the casing to confine the air pressure within the inner tube to the interior of the casing so that the walls of the latter will be forced tightly against the walls of the mold. For this purpose, I provide a sectional rim 34 which has a cutout or gap and covers an arc of less than 360 and greater than 180 degrees. It is made up of two sections 35 and 36 which covers an area of approximately 250 to 270 degrees, but it is not desired to be limited to such particular arc, as this depends somewhat upon the size and length of the mold. The shorter section 35 covers an area of substantially 90 degrees or slightly more or less, and the longer section 36 covers the remaining area of from substantially 160 to 180 degrees, but may be slightly varied either way. It is produced from a steel flanged rim which may be of the clincher type having tire retaining flanges 37 preferably of the permanent type and a wall or web between. The rim at the inner circumference may be straight, curved or dropped in the form usually known as a drop center rim to take the beads of the casing, although it is not desired to be limited to any particular cross sectional shape of rim. In practice, a rim which is relatively straight or with a slight drop at the center has been found to be usable in accommodating 6 or 7 different sizes of tires within a certain range, such as a 6 inch tire with a 16 inch inside diameter or slight variations thereof in fractions either way. This rim of the ordinary or any preferred type is cut across at three points, one cut producing the ends of the sections 35 and 36, which are hinged together at the inside as indicated at 38, so that the sections may swing inwardly relatively or one relative to the other, but when swinging outwardly to a true circle the adjacent edges will abut not only at the inside but particularly at the clincher flanges which will absolutely limit the movements thereof and insure rigidity when the sections are in alignment in such position. The other two cross sectional cuts form a cutout, that is the portion of the rim between the cuts which form the ends 39 and 40 of the sectional rim 34 is removed entirely over an arc determined by the length of the mold or the arcuate extent thereof usually slightly less than 90 degrees, although this may be varied to 90 degrees or more. These ends are also preferably bevelled outwardly so as to diverge in the same direction from the ends of the mold 20 whereby to readily accommodate itself to or fit molds which may slightly vary in arcuate extent. It should also be noted that the end 40 is substantially diametrically opposite the hinge but preferably set back slightly out of alignment therewith. This not only facilitates handling of the sectional rim but facilitates application thereof to the tire and the mold with the ends 39 and 40 overlying the ends of the bead plate but obviating the necessity of accurate machining or fit between the ends of the sectional rim and the ends of the mold as has heretofore been required by devices of the prior art. It may also be mentioned that as heretofore pointed out, the use of an inner tube which is comparatively inexpensive and which may be one that has been discarded from a tire, obviates the necessity of employing the customary expensive air bag or sack usually made of D-shaped cross section and of particularly expensive construction and materials and designed to fit the beads of the tire and the mold especially the matrix and the bead irons or plate and which at the present time are relatively unobtainable.

In order to accommodate the valve stem 17 it is only necessary that one of the rim sections be provided with a hole, and in such instances the longer section 36 is so provided, but both rim sections are preferably provided with a plurality of holes 41 so that the tube may be shifted circumferentially to extend the stem through any one of the several holes to position a different segment of the tube within the mold whereby to prevent unnecessary deterioration thereof by repeated subjection to the vulcanizing heat at the same point. The holes that are not in use may be plugged by round head screws 42 threaded into the holes or otherwise. This prevents the tube from pushing into or through the holes and pinching or puncturing the same at said points. In order to hold the sectional rim in position in the mold with the cutout or gap spanning or engaging the ends of the bead iron of the mold and providing a complete annular seat for the tire in connection with the cavity of the mold and the engagement of the ends of the split rim with the ends of the bead plate, the latter is unattached or separate from the rim. Also, the interior of the rim sections are provided with one or more stops, shoulders or abutments in the form of ribs or lugs 43 extending transversely and riveted or otherwise secured to the inner surfaces of the rim sections as indicated at 44. Two of these lugs are preferably located on or immediately above a horizontal diametrical line between the opposed sections 35 and 36 of the rim as indicated at 45 and the others preferably located slightly above and spaced therefrom. In addition, the bead plate is provided with abutment or stop means for engagement by rigid longitudinal bars or braces 46 adapted to extend between the same and the lugs 43 in upwardly and outwardly divergent relation. For this purpose a separate stiff hardened metallic plate 47 is mounted as the chord of an arc on the concaved upper side of the bead plate 29 and is provided with stops or abutments in the form of ribs 48 extending transversely in parallel relation, preferably spaced from the ends, and terminating spaced from or short of the side edges thereof. In the form shown in Fig. 1 the bars 46 are shown engaging the lower lugs 43 and the rim is composed of two sections.

Clamping means is provided to exert pressure on the bead plate to confine the tire within the mold in snug conforming relation thereto to insure proper vulcanization. For this purpose and as illustrated, a pair of threaded stems or uprights 49 having their lower ends threaded into sockets 50 in the top of the mold at each side of the cavity thereof slidably receive and guide a horizontal cross member 51 having apertured ends receiving the stems and the nuts 52 are threaded on the stems to engage the ends of the cross member 51 which limit the upward movement of the latter. A pressure screw 53 is threaded through a central threaded opening in the cross member and provided at its lower end with a swivelled pressure plate or head 54, while the upper end has a handle 55 by which it may be turned to exert downward pressure on the bead plate 29 by engagement with the plate 47 resting thereon. By this means the cross member is urged upwardly, limited by the nuts so that the bars 46 may be inserted between the lugs and the ribs to maintain the parts firmly in assembled relation. Of course, it is to be understood that the inner tube is not inflated to the desired pressure until after the collapsible rim is placed in position within the tire and on the mold, which causes the rim sections to be forced inwardly and downwardly in properly centered position so that the break in the tire is properly located within the mold, and with the two bars in position, proper pressure is exerted on the bead plate, after which the tube is inflated to the desired pressure. Thus, after the tire is positioned in the mold, as previously described, and the parts assembled, as related, and with the necessary pressure in the inner tube to cause the tire to conform to the mold, the latter is heated to the desired temperature by the admission of steam to the steam cavity 23 to cure and vulcanize the uncured reenforced rubber which has been applied to the part of the tire being repaired.

It may also be pointed out that the gap or cutout of the sectional rim is preferably somewhat larger than the length of the bead plates, and by using the two bars or rods and plate on the bead plates against the stops or abutments in the manner described, when air is forced into the tube, the pressure created forces the rim downwardly so that the ends travel to meet the ends of the bead plates or mold and the rods become taut and the rim immediately becomes absolutely locked in position and against possible accidental displacement. In this condition no further expansion of the rim is possible, so that any displacement or shifting is prevented to insure an efficient repair. If the bars or rods are found difficult to insert between the abutments or stops because of possible variation of different tires, the pressure plate or head 54 can be tightened downwardly against the plate 47 and the bead plate, so that the bars may be readily inserted and then by reversing the screw of the pressure plate or clamping means the rods will be forced by air pressure upwardly against the stops or lugs of the rim sections so that the latter may be securely locked in position and produce an absolutely perfect molding for the tire when the tube is inflated to the proper pressure. Actually the rim will not shift or travel more than a small fraction of an inch, if at all, so that at all times there is a sufficient contact of the flanges of the rim with the beads of the tire to insure a safe retention of the tire on the rim. If at any time a tire is extremely aged so that great pressure may weaken the same a loose tire reliner, such as 19, may be quickly dropped into the tire before or after the tube is inserted.

Figure 11:
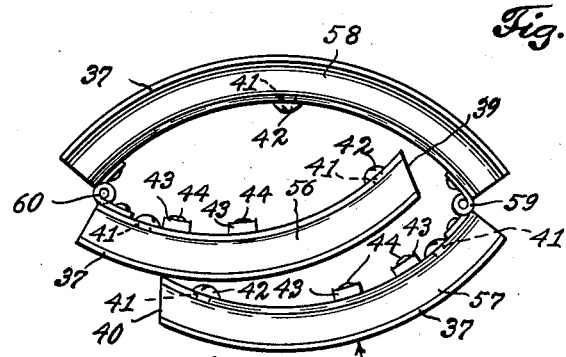
Fig. 11 is a side elevation showing the sectional rim illustrated in Fig. 10 collapsed for insertion in or removal from a tire.

In the form of the invention shown in Figs. 10 and 11 of the drawings, the construction is the same except that the rim is made up of three sections 56, 57, and 58 of different lengths hinged together as at 59 and 60 in the same manner that the sections 35 and 36 are hinged at 38. The purpose of this is to permit proper collapsing of the rim to the desired reduced size for larger tires and to facilitate the insertion and removal thereof before and after the vulcanizing operation, respectively. This renders the rim more easily handled and in this form the bars or braces 61 may be longer than the bars 46 to engage the upper set of lugs 43, or may be the same length or shorter to engage the lower set of lugs 43. These bars engage the ribs 48 on the plate 47 in the same manner as previously described, and the operation and use of the device is otherwise the same. In Fig. 10, the rim is shown partially collapsed in dotted lines and in Fig. 11, the rim is shown in collapsed form.

The use of the sectional rim with hinged sections allows the rim to collapse so that any operator in a matter of seconds can mount the rim by hand, no tool being necessary, thereby cutting down preparation time enormously and allowing any shop to benefit by increased production.

The apparatus also eliminates the use of costly sectional air bags which under normal times cost from ten to fifteen times more than the cost of a new tube. By using used tubes the saving is still greater. The advantage of regular inner tubes is also marked inasmuch as sectional air bags must at all times be carefully applied to tires of similar contours to obtain the proper results and full life. An ordinary inner tube can safely expand to any contour. Whereas, one rim of any given diameter and one tube of the same diameter can take in all tires having beads of the same diameter, an operator using sectional air bags may have to use as high as seven different sized sectional air bags to accommodate the same range of tire sizes. An ordinary inner tube is practically always available and repairable while a sectional air bag is manufactured by a very limited number of firms and can hardly ever be repaired satisfactorily once damaged. Particularly at the present time sectional air bags are practically unobtainable by average vulcanizing shops. During the present crisis, this invention will conserve valuable rubber by making it unnecessary to further manufacture sectional air bags as long as rubber stocks remain limited. The process is simple, whereas in the use of sectional bags, a man operating the molds must be skilled from long experience, as otherwise he ruins expensive bags. By the use of this equipment unskilled help can be fully qualified the first day of operation. By extending the present standard mold and cavity thereof to greater lengths to take care of longer breaks or in some cases to vulcanize more than one break at one time or a full circle vulcanizing mold cavity to cure out tires that have continuous loose cords on the inside caused by running flat without any air or under-inflation, this will properly cure such defect by using cushion stock and curing back loose cords. This will then eliminate the unsatisfactory method now used of relining such tires with additional two or four plies of used cord creating a very heavy bulky tire and reducing the inside area so that the proper sized tube cannot be further used.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A tire vulcanizing apparatus including a mold adapted to receive a tire with an inner tube therein, said mold including a bead plate, a sectional rim mounting the tire and engaging the ends of the bead plate, and a separable bracing means between the rim and the bead plate.

2. The combination with a tire mold adapted to receive a portion of a tire with an inner tube therein and including bead irons engaging the beads of the tire, of a rim in the tire having a cut-out forming spaced ends to span the ends of the mold, means between the rim and the bead irons to brace the same and means for exerting pressure on the bead irons.

3. The combination with a tire mold adapted to receive a portion of a tire with an inner tube therein and including bead irons engaging the beads of the tire, of a rim in the tire having a cut-out forming spaced ends to span the ends of the mold, said rim including hinged sections, lugs on said sections at the inside, pressure means to force the bead irons against the tire and separable bars between the bead irons and the lugs.

4. A vulcanizing apparatus including a sectional rim having a cut-out to bridge a tire vulcanizing mold the rim at each end of the cut-out being beveled and comprising hinged sections, said rim having at least one valve stem hole therein.

5. A vulcanizing apparatus including a sectional rim having a cut-out to bridge a tire vulcanizing mold the rim at each end of the cut-out being beveled and comprising hinged sections, said rim having one or more valve stem holes therein, and means to close all of said holes except one whereby the tire may be shifted around the rim to dispose different portions of the tire in the mold.

6. A tire repair vulcanizer including a sectional cavity mold adapted to receive a portion of the tire to be repaired and including a bead plate to engage the beads of the tire, an annular inner tube in the tire, a sectional inwardly collapsible rim having a gap and adapted to span and fit the mold and with the bead plate completing a full annular seat for the tire, pressure exerting means carried by the mold and engaging the bead plate and upwardly divergent bracing means extending between certain rim sections at substantially diametrically opposite sides thereof and the pressure means, said rim being unattached to and separate from the vulcanizer and bead plate.

7. A vulcanizing apparatus comprising a mold in which a portion of a tire is mountable for vulcanization and including a bead iron, a sectional rim comprising hinged sections braced outwardly and adapted to collapse inwardly, said rim having a cut-out of substantially the same circumferential extent as the mold, the ends of the rim at the cut-out adapted to engage the ends of said bead iron, lugs on the inner surface of the rim sections, a plate adapted to engage said bead irons, ribs on said plate, and bars between said lugs and said ribs to hold the parts assembled when the tire is inflated.

8. In a vulcanizing apparatus, a tire vulcanizing mold adapted to receive a portion of a tire with an inner tube, and having a bead plate to engage the beads of the tire, a rim comprising a plurality of hinged sections limited in their outward movement to a portion of a true circle and adapted to collapse inwardly, the free ends of said sections being spaced apart and beveled to fit against the ends of the bead plate, stops on the inner surfaces of the rim sections, means to exert pressure against the bead plate, abutments on the last said means and brace bars between said stops and abutments.

9. A vulcanizing apparatus comprising a mold section adapted to receive a portion of a tire with an inner tube and having a bead plate to engage the beads of the tire, means carried by the mold for exerting adjustable pressure against the bead plate and including a pressure plate resting on said bead plate, a rim consisting of a plurality of hinged sections limited in their outward movement to a portion of a true circle and adapted to collapse inwardly, the free end of the rim sections being spaced apart to engage the end of the bead plate, stops on the inner surfaces of the rim sections, abutments on the pressure plate, and diverging brace bars extending from said abutments to said stops to hold the tire and rim in position when the tire is inflated to vulcanizing pressure.

10. In an apparatus for vulcanizing tire repairs, an arcuate vulcanizing mold for encompassing a portion of a tire, said mold including a bead plate, and a sectional rim formed of a plurality of hinged sections the free ends of said rim engaging the ends of the bead plate and unattached thereto.

IRVING N. HERMAN.